(12) United States Patent
Tanaka et al.

(10) Patent No.: US 8,863,017 B2
(45) Date of Patent: Oct. 14, 2014

(54) ELECTRONIC APPARATUS, PROGRAM, AND CONTROL METHOD FOR DISPLAYING ACCESS AUTHORITY FOR DATA FILES

(75) Inventors: Tomohisa Tanaka, Tokyo (JP); Tsuyoshi Ishikawa, Kanagawa (JP); Qihong Wang, Tokyo (JP); Akihiro Komori, Tokyo (JP)

(73) Assignee: Sony Corporation, Tokyo (JP)

( * ) Notice: Subject to any disclaimer, the term of this patent is extended or adjusted under 35 U.S.C. 154(b) by 101 days.

(21) Appl. No.: 13/448,715

(22) Filed: Apr. 17, 2012

(65) Prior Publication Data

US 2012/0297328 A1   Nov. 22, 2012

(30) Foreign Application Priority Data

May 20, 2011   (JP) .................................. 2011-114177

(51) Int. Cl.
  *G06F 3/048*   (2013.01)
  *G06F 21/00*   (2013.01)
(52) U.S. Cl.
  CPC ................ *G06F 3/048* (2013.01); *G06F 21/00* (2013.01)
  USPC ............ 715/769; 715/810; 715/835; 715/764
(58) Field of Classification Search
  CPC .................................................... G06F 3/0486
  USPC .......................................................... 715/769
  See application file for complete search history.

(56) References Cited

U.S. PATENT DOCUMENTS

| | | | |
|---|---|---|---|
| 2007/0016872 A1* | 1/2007 | Cummins et al. | 715/769 |
| 2010/0122194 A1* | 5/2010 | Rogers | 715/769 |
| 2011/0072375 A1* | 3/2011 | Victor | 715/765 |

FOREIGN PATENT DOCUMENTS

JP   2006-251977   9/2006

OTHER PUBLICATIONS

ITBuddy, How to Drag and Drop Files in Windows Vista and XP and drag an Open Window, http://itbuddy.org/drag-and-drop.html, published Jan. 24, 2009.*
Microsoft, System Requirements for Windows Vista, http://support.microsoft.com/kb/919183, published Sep. 13, 2006.*
Apple Inc., iPod touch User Guide for iPhone OS 3.0 Software, created Jun. 12, 2009, p. 20.*
Nick Hessen, Locktopus: Password Protect Your Apps [Review], http://modmyi.com/forums/iphone-news/723654-locktopus-password-protect-your-apps-review.html, Aug. 15, 2010.*
Ziphone, "New Cydia Tweak: Password Protect iPhone Apps and Folders Using Lockdown Pro 2.0", Feb. 18, 2011, http://www.ziphone.org/2011/02/new-cydia-tweak-password-protect-iphone.html.*
Modmyi, "Locktopus: Password Protect Your Apps [Review]",Aug. 15, 2010, http://modmyi.com/forums/iphone-news/723654-locktopus-password-protect-your-apps-review.html.*

* cited by examiner

*Primary Examiner* — William Bashore
*Assistant Examiner* — Daniel Rodriguez
(74) *Attorney, Agent, or Firm* — Sherr & Jiang, PLLC

(57) ABSTRACT

An electronic apparatus includes an input unit and a controller. The input unit is configured to detect a user operation and output a signal corresponding to the user operation. The controller is configured to cause a data icon to be displayed on a screen of a display unit, judge a drag operation with respect to the data icon based on the signal from the input unit, and cause an icon to be displayed on the screen according to the drag operation, the icon indicating a state of an access authority of data related to the data icon.

18 Claims, 16 Drawing Sheets

| Access authority | Permitted/Unpermitted |
|---|---|
| Edit (change) | Permitted |
| Copy | Permitted |
| Print | Permitted |

ELECTRONIC APPARATUS, PROGRAM, AND CONTROL METHOD FOR DISPLAYING ACCESS AUTHORITY FOR DATA FILES

BACKGROUND

The present disclosure relates to an access authority of data.

In related art, there has been known a technique in which when opening data of a file and the like, a user sets an access authority with respect to the data (e.g., see Japanese Patent Application Laid-open No. 2006-251977).

For example, when the user opens a file using a PC (Personal Computer), in general, by setting an ACL (Access Control List), the user sets an access authority.

After that, the user drags an icon indicating the file to which the access authority is set, and drops the icon at a position at which a public folder such as a shared folder is displayed. Thus, the file to which the access authority is set is copied (or moved) to the folder.

SUMMARY

Setting an access authority is important for security reasons, and thus, in general, the user checks whether an access authority is correctly set with respect to a file. However, there is a problem in that checking whether the access authority is correctly set is troublesome.

In view of the circumstances as described above, there is a need for a technique with which when dragging a data icon, a user can easily check a state of an access authority set to data related to the icon.

According to an embodiment of the present disclosure, there is provided an electronic apparatus including an input unit and a controller. The input unit is configured to detect a user operation and output a signal corresponding to the user operation. The controller is configured to cause a data icon to be displayed on a screen of a display unit, judge a drag operation with respect to the data icon based on the signal from the input unit, and cause an icon to be displayed on the screen according to the drag operation, the icon indicating a state of an access authority of data related to the data icon.

With this structure, when dragging a data icon, a user can easily check a state of an access authority set to data related to the icon.

In the electronic apparatus, the controller may cause, while causing the data icon to be displayed at an original drag position, a copy of the data icon to be displayed at a drag position according to the drag operation with respect to the data icon, and cause the icon to be displayed on a trajectory of the copy of the data icon that is drawn by movement of the copy of the data icon according to the drag operation.

With this structure, the icon can be displayed at an appropriate position.

In the electronic apparatus, the controller may cause, while causing the data icon to be displayed at an original drag position, a copy of the data icon to be displayed at a drag position according to the drag operation with respect to the data icon, judge whether the drag position is within a predetermined area on the screen, and cause, when the drag position is within the area, the icon to be displayed.

In the electronic apparatus, the predetermined area on the screen may be an area where the data can be one of copied and moved, and which at least includes an area where the data is to be opened.

With this structure, the icon can be displayed at an appropriate timing.

In the electronic apparatus, the predetermined area on the screen may be an area where the data can be one of copied and moved, and which is set to be larger than an area where the data is to be opened.

In the electronic apparatus, the controller may cause an access authority editing icon for editing a state of an access authority with respect to data to be one of copied and moved to be displayed as the icon on the screen, judge a user operation with respect to the access authority editing icon based on the signal from the input unit, and change the state of the access authority with respect to the data to be one of copied and moved according to the user operation.

With this structure, by making a user operation with respect to the access authority editing icon displayed on the screen according to the drag operation with respect to the data icon, a user can edit the state of the access authority with respect to data to be one of copied and moved.

According to an embodiment of the present disclosure, there is provided a program that causes an electronic apparatus to execute the steps of:

detecting a user operation;

outputting a signal corresponding to the user operation;

displaying a data icon on a screen of a display unit;

judging a drag operation with respect to the data icon based on the signal; and displaying an icon on the screen according to the drag operation, the icon indicating a state of an access authority of data related to the data icon.

According to an embodiment of the present disclosure, there is provided a control method including detecting a user operation.

A signal corresponding to the user operation is output.

A data icon is displayed on a screen of a display unit.

A drag operation with respect to the data icon is judged based on the signal.

An icon is displayed on the screen according to the drag operation, the icon indicating a state of an access authority of data related to the data icon.

As described above, according to the embodiments of the present disclosure, when dragging a data icon, a user can easily check a state of an access authority set to data related to the icon.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

First Embodiment

Configuration of Entire Electronic Apparatus and Configuration of Each Unit

Figure 1:
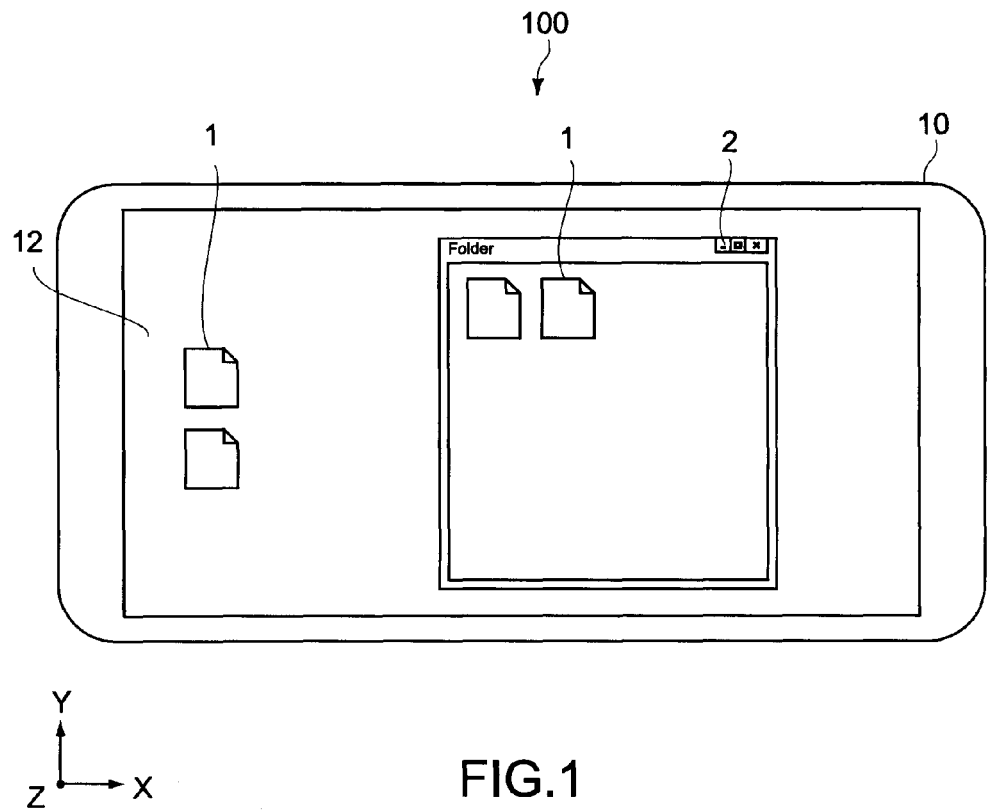
FIG. 1 is a plan view showing an electronic apparatus (tablet PC) according to an embodiment of the present disclosure.

FIG. 1 is a plan view showing an electronic apparatus 100 according to a first embodiment of the present disclosure. In the descriptions of this embodiment, a tablet PC 100 will be taken as an example of the electronic apparatus 100.

As shown in FIG. 1, the tablet PC 100 includes a plate-like casing 10 that is thin in a z-axis direction.

In the casing 10, a display unit 12 including a screen is provided. In the display unit 12, a touch sensor 13 (see FIG. 2) (input unit) that detects a contact state of a finger of a user, a stylus pen, and the like is provided.

The display unit 12 is constituted of, for example, a liquid crystal display or an EL (Electro-Luminescence) display. Examples of the touch sensor 13 include a resistive touch sensor and a capacitance touch sensor, though not limited thereto. It should be noted that in the first embodiment, a multi-touch input can be performed on the touch sensor 13.

FIG. 1 shows an example of a GUI (Graphical User Interface) displayed on the screen. In this example, a desktop and a folder 2 (shared folder) are displayed on the screen, and a file icon 1 (data icon) is displayed on the desktop and in the folder 2. As a file (data) type of the file icon 1, there are a document file, an image file, a music file, a moving image file, a program file, and the like.

Figure 2:
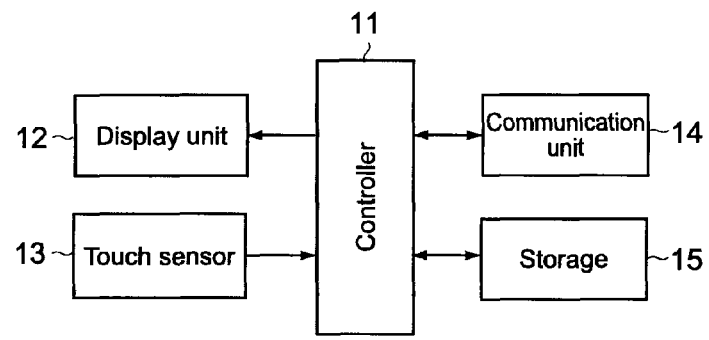
FIG. 2 is a block diagram showing an electrical structure of the tablet PC.

FIG. 2 is a block diagram showing an electrical structure of the tablet PC 100.

As shown in FIG. 2, the tablet PC 100 includes a controller 11, a communication unit 14, and a storage 15 in addition to the display unit 12 and the touch sensor 13.

The controller 11 is constituted of a CPU (Central Processing Unit) and the like. The controller 11 executes various operations based on various programs and collectively controls respective units of the tablet PC 100.

The storage 15 includes a nonvolatile memory (e.g., ROM (Read Only Memory)) that stores various programs requisite for processing of the controller 11 and a volatile memory (e.g., RAM (Random Access Memory)) that is used as a working area of the controller 11. The programs may be read out from a recording medium such as an optical disc and a semiconductor memory.

The communication unit 14 transmits and receives information to/from other apparatuses. The communication unit 14 may use wireless communication or wired communication.

[Explanation of Operation]

Next, processing of the tablet PC 100 according to the first embodiment will be described. FIGS. 3 to 6 and FIGS. 8 to 15 are each a flowchart showing the processing of the tablet PC 100 according to the first embodiment. FIG. 7 is a diagram showing an example of an access authority set to a file corresponding to the file icon 1.

FIGS. 16 to 22 are each a diagram showing a state of the screen at a time corresponding processing is executed by the tablet PC 100 according to a user operation with respect to the screen.

It should be noted that in the first embodiment, the processing will be described based on the assumption that the tablet PC 100 conforms to a multi-touch system.

Figure 3:
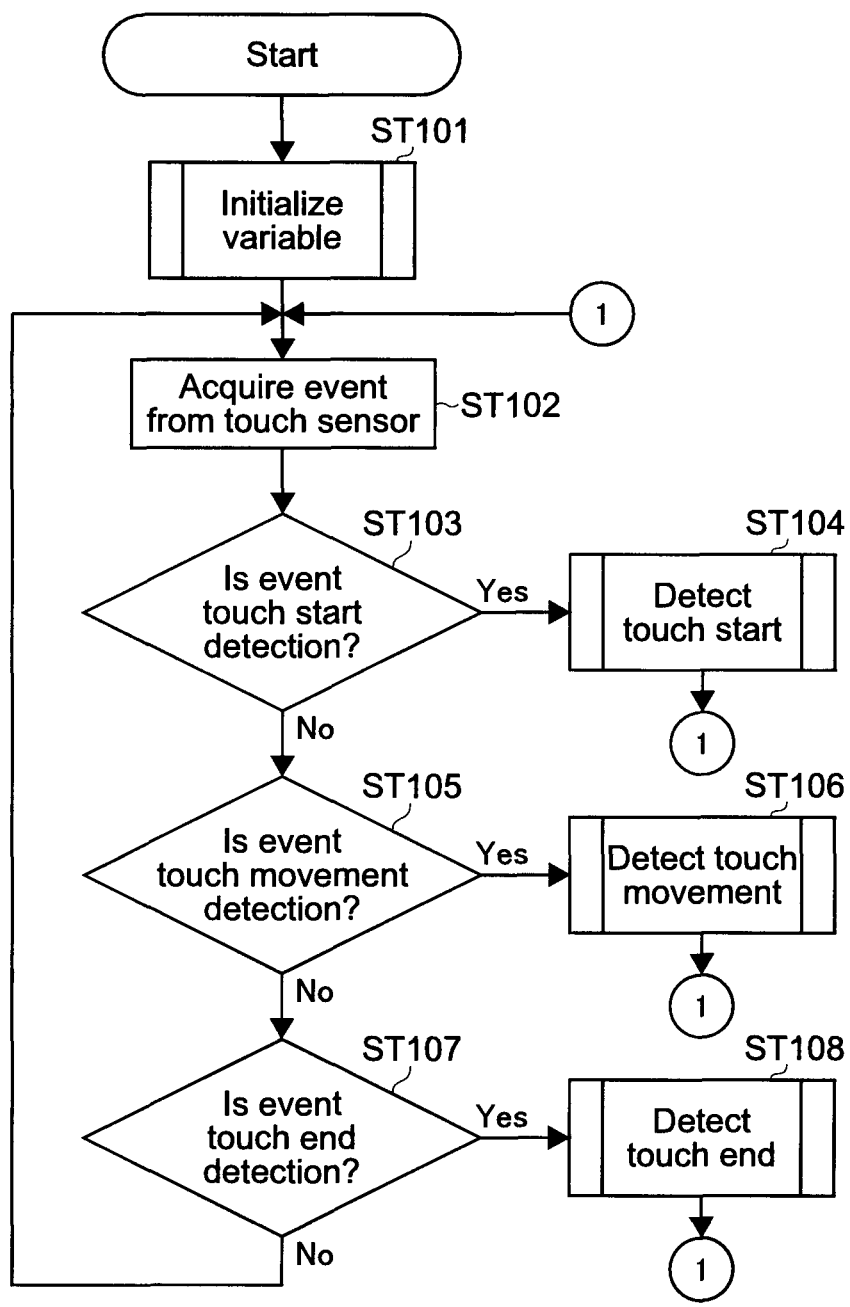
FIG. 3 is a flowchart showing processing of the tablet PC.

Referring to FIG. 3, the controller 11 of the tablet PC 100 first executes a variable initialization (Step 101).

Figure 4:
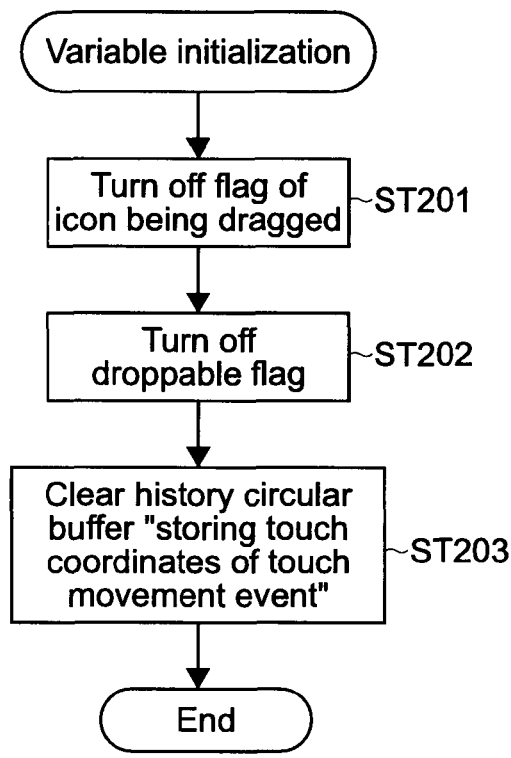
FIG. 4 is a flowchart showing processing of the tablet PC.

Referring to FIG. 4, the controller 11 turns off a flag of a file icon being dragged as the variable initialization (Step 201). Subsequently, the controller 11 turns off a droppable flag (Step 202). Subsequently, the controller 11 clears a history circular buffer that stores touch coordinates of a touch movement event (Step 203).

The history circular buffer is a buffer that additionally stores coordinates of touch movement events in the order in which the events are generated. As the history circular buffer, for example, a FIFO (First In First Out) buffer is used, in which the first added event (oldest event) is stored at the head of the buffer and the last added event (latest event) is stored at the end of the buffer. For example, the history circular buffer is assumed to be a buffer capable of storing 1,000 coordinates. In this case, when the controller 11 additionally stores a new coordinate in the history circular buffer, if the circular buffer is filled up (1,000 coordinates are stored), the controller 11 first deletes the first coordinate at the head of the circular buffer. Then, the controller 11 additionally stores the new coordinate at the end of the circular buffer (as 1,000th coordinate).

Then, referring back to FIG. 3, the controller 11 acquires an event from the touch sensor 13 (Step 102), and judges whether the event acquired from the touch sensor 13 is a touch start detection (Step 103). When the event is the touch start detection (YES in Step 103), the controller 11 executes processing corresponding to the touch start detection (Step 104). Upon executing the processing corresponding to the touch start detection, the controller 11 returns to Step 102 and acquires an event from the touch sensor 13 again.

On the other hand, when the event acquired from the touch sensor 13 is not the touch start detection (NO in Step 103), the controller 11 judges whether the event is a touch movement detection (Step 105). When the event is the touch movement detection (YES in Step 105), the controller 11 executes processing corresponding to the touch movement detection (Step 106). Upon executing the processing corresponding to the touch movement detection, the controller 11 returns to Step 102 and acquires an event from the touch sensor 13 again.

On the other hand, when the event acquired from the touch sensor 13 is not the touch movement detection (NO in Step 105), the controller 11 judges whether the event is a touch end detection (Step 107). When the event is the touch end detection (YES in Step 107), the controller 11 executes processing corresponding to the touch end detection (Step 108). Upon executing the processing corresponding to the touch end detection, the controller 11 returns to Step 102 and acquires an event from the touch sensor 13 again.

Figure 5:
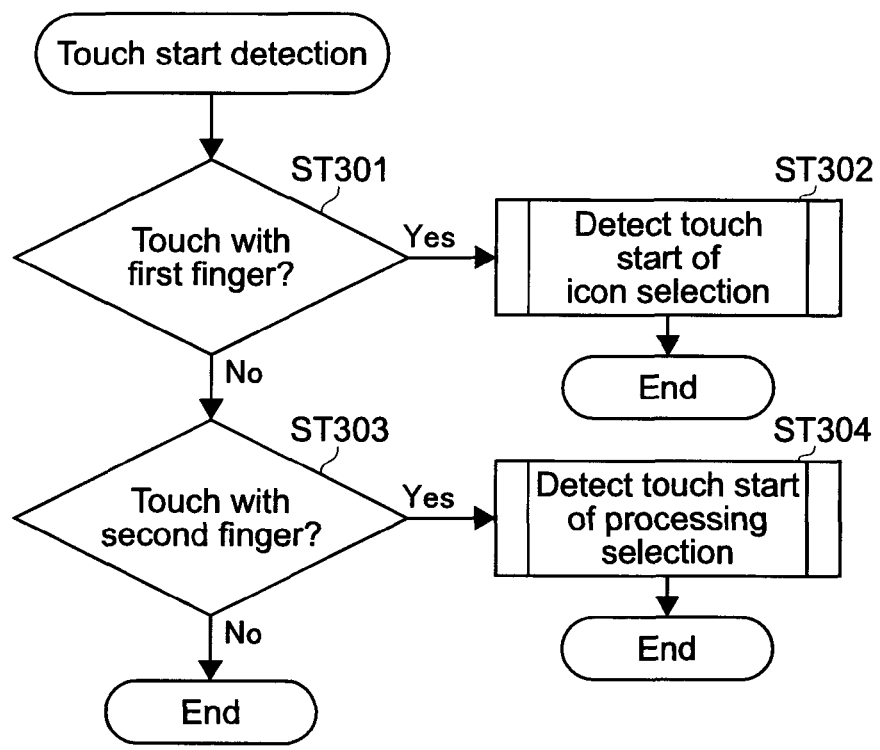
FIG. 5 is a flowchart showing processing of the tablet PC.

Referring to FIG. 5, the processing of Step 104 shown in FIG. 3 (processing carried out when touch start is detected) will be described. When the event acquired from the touch sensor 13 is the touch start detection (YES in Step 103), the controller 11 judges whether the touch start is a touch start of a first finger (or stylus pen etc.; same holds true in descriptions below) (Step 301). When judged as the touch start of a first finger (YES in Step 301), the controller 11 executes processing that is carried out when a touch start is detected at a time the file icon 1 is selected (Step 302).

On the other hand, when judged that the touch start is not the touch start of a first finger (NO in Step 301), the controller 11 judges whether the touch start is a touch start of a second finger (Step 303). When judged as the touch start of a second finger (YES in Step 303), the controller 11 executes processing that is carried out when a touch start is detected at a time the processing is selected (Step 304).

Figure 6:
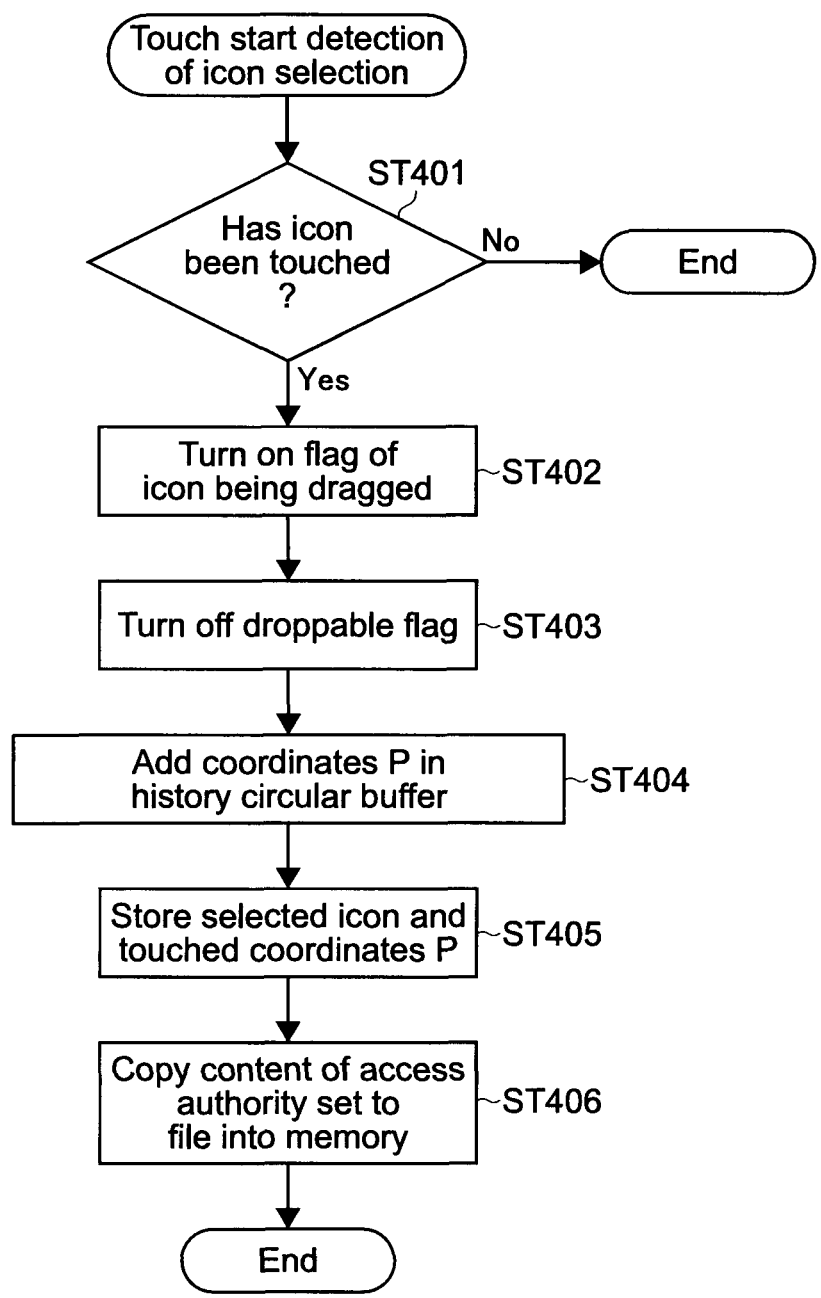
FIG. 6 is a flowchart showing processing of the tablet PC.
Figures 7, 8:
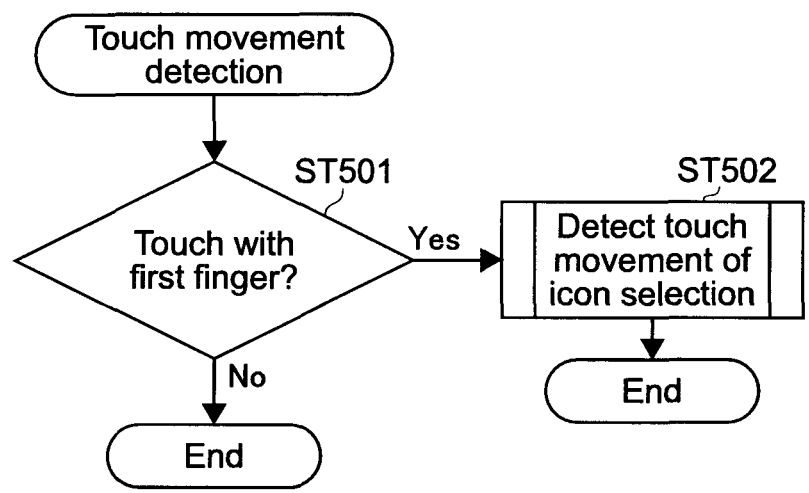
FIG. 7 is a diagram showing an example of an access authority set to a file corresponding to a file icon.
FIG. 8 is a flowchart showing processing of the tablet PC.

Referring to FIG. 6, the processing of Step 302 shown in FIG. 5 (processing carried out when touch start is detected at time file icon 1 is selected) will be described. When the touch start is the touch start of a first finger (YES in Step 301), the controller 11 judges whether a position at which the file icon 1 is displayed on the screen has been touched (Step 401). When judged that the position at which the file icon 1 is displayed has been touched (YES in Step 401), the controller 11 turns on the flag of the file icon being dragged (Step 402). Next, the controller 11 turns off a droppable flag (Step 403).

Subsequently, the controller 11 additionally stores coordinates P obtained at the touch start in the history circular buffer (Step 404). Subsequently, the controller 11 stores the selected file icon 1 and the coordinates P obtained at the touch start in the storage 15 (Step 405). Then, the controller 11 copies and stores a content of an access authority set to a file corresponding to the selected file icon 1 in the storage 15 (Step 406).

FIG. 7 shows an example of the access authority set to the file corresponding to the selected file icon 1. In the example shown in FIG. 7, as the access authority, file editing (change) is "permitted", a file copy is "permitted", and a file printing is "permitted.

Referring to FIG. 8, the processing of Step 106 shown in FIG. 3 (processing carried out when touch movement is detected) will be described. When the event acquired from the touch sensor 13 is the touch movement detection (YES in Step 105), the controller 11 judges whether the touch movement is a touch movement by a first finger (Step 501). When judged that the touch movement is the touch movement by a first finger (YES in Step 501), the controller 11 executes processing that is carried out when a touch movement is detected at a time the file icon 1 is selected (Step 502).

Figure 9:
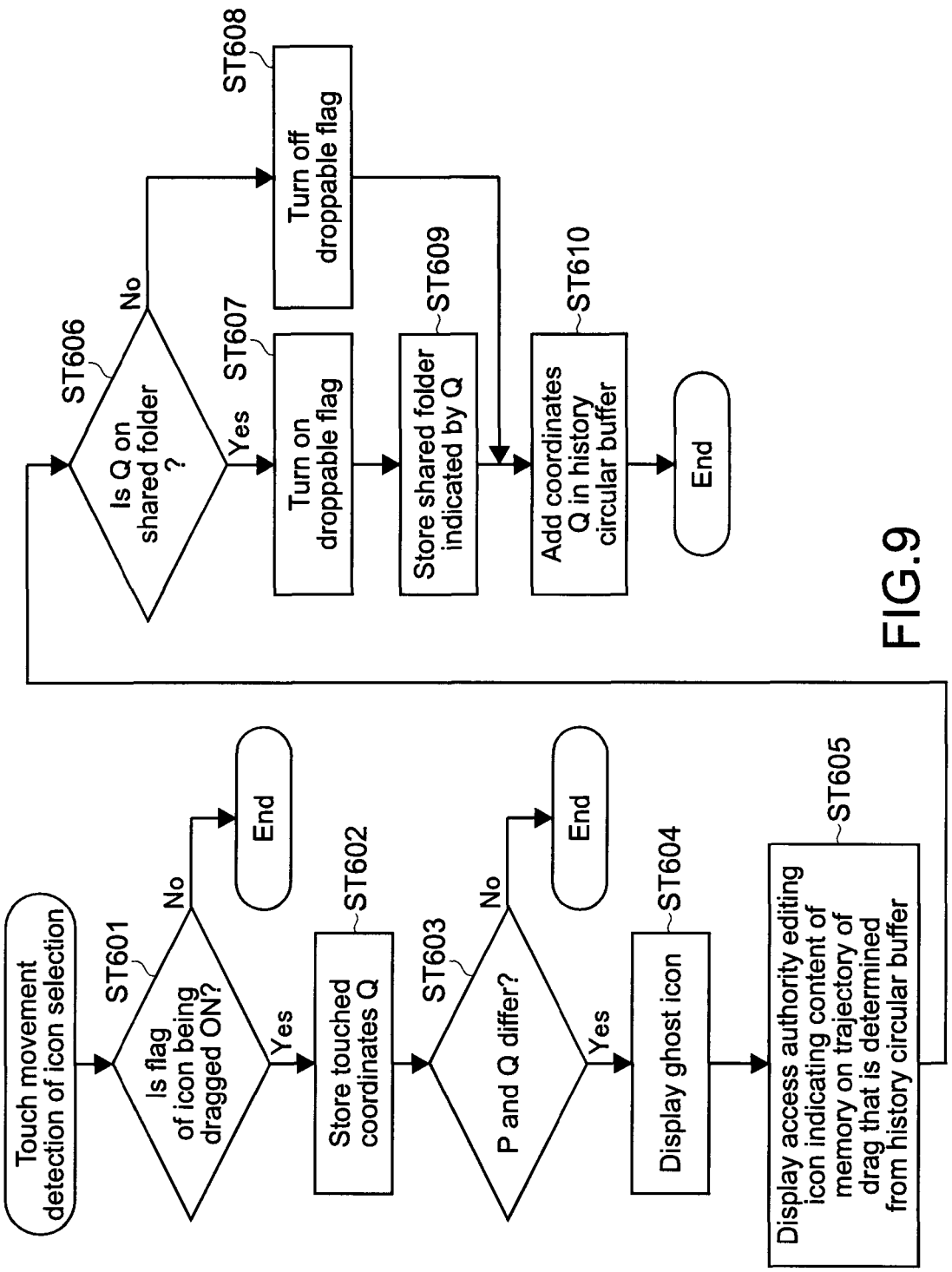
FIG. 9 is a flowchart showing processing of the tablet PC.

Referring to FIG. 9, the processing of Step 502 shown in FIG. 8 (processing carried out when touch movement is detected at time file icon 1 is selected) will be described. When judged that the touch movement is the touch movement by a first finger (YES in Step 501), the controller 11 judges whether the flag of the file icon being dragged is ON (Step 601).

When the flag of the file icon being dragged is ON (YES in Step 601), the controller 11 stores the coordinates Q currently being touched by the user in the storage 15 (Step 602). Next, the controller 11 judges whether the coordinates P obtained when the touch with respect to the file icon 1 has been started (see Step 405 shown in FIG. 6) differ from the coordinates Q currently being touched by the user (Step 603).

When the coordinates P and Q differ (when file icon 1 is dragged) (YES in Step 603), the controller 11 displays a ghost icon 4 (copy of data icon) on the screen (Step 604). Further, in this case, the controller 11 displays, based on the content of the access authority stored in the storage 15 (see FIG. 7), an access authority editing icon 6 on a trajectory of the ghost icon 4 that is drawn by the drag (Step 605).

The trajectory of the ghost icon 4 that is drawn by the drag can be calculated based on the coordinates stored in the history circular buffer. For example, when the history circular buffer is a buffer capable of storing 1,000 coordinates, the controller 11 draws the access authority editing icons 6 with spaces each corresponding to v coordinates counting from the end of the buffer, for example. Describing a specific example, when v equals 50 and the number of the access authority editing icons 6 to be displayed on the screen is three, the controller 11 draws the access authority editing icons 6 at 50th, 100th, and 150th coordinates counting from the end of the buffer.

For example, when three access authority editing icons 6 should be displayed, if only 120 coordinates are stored, the controller 11 displays two access authority editing icons 6 at 50th and 100th coordinates counting from the end of the buffer. It should be noted that the number of the access authority editing icons 6 displayable on the screen is limited by buffer size/v.

Figure 16:
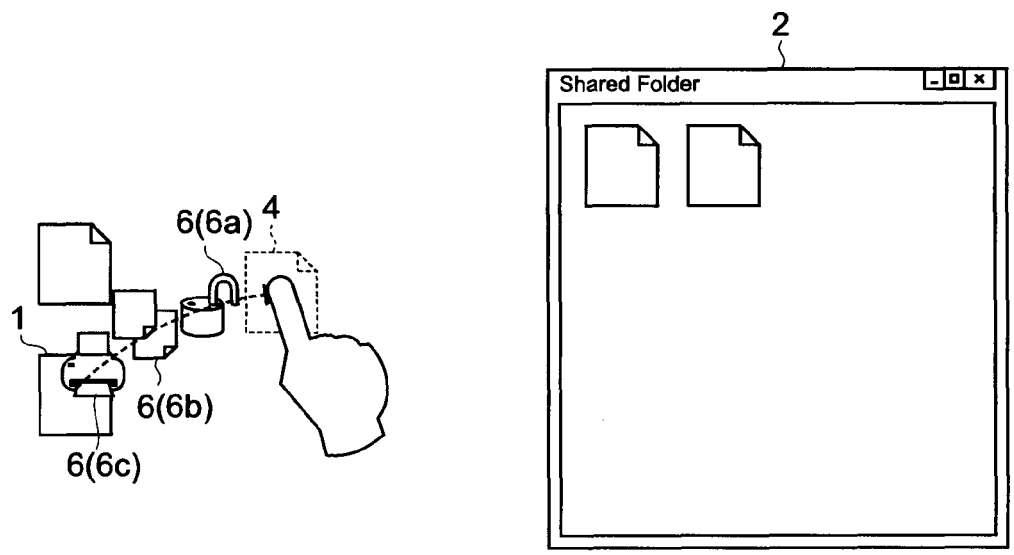
FIG. 16 is a diagram showing a state of a screen at the time a user touches a file icon displayed on a desktop with a finger and slides the finger without releasing it from the screen (drag operation)
Figure 17:
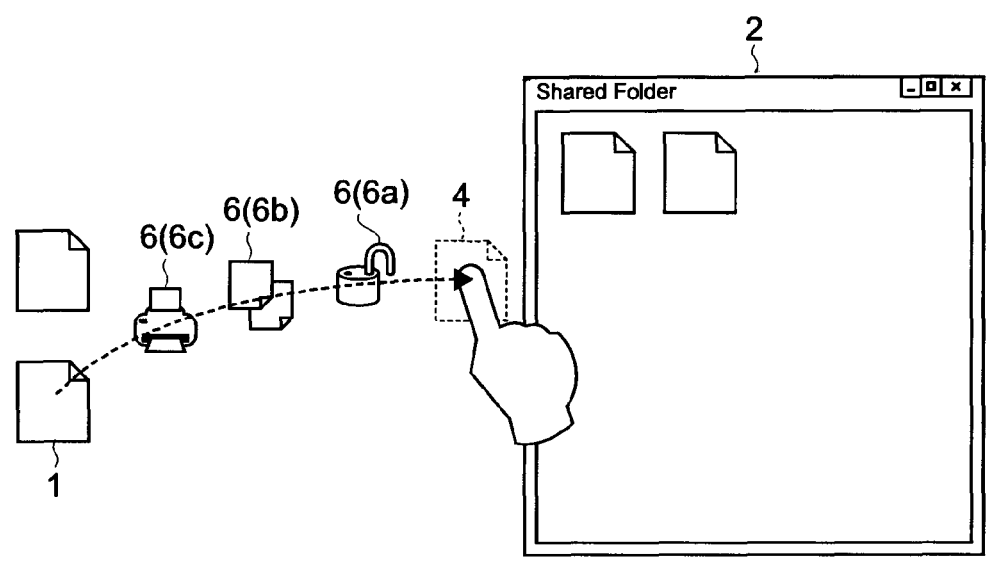
FIG. 17 is a diagram showing a state of the screen at the time the user touches the file icon displayed on the desktop with a finger and slides the finger without releasing it from the screen (drag operation)

FIGS. 16 and 17 each show a state of the screen at a time the user touches the file icon 1 displayed on the desktop with a finger and slides the finger without releasing it from the screen (drag operation).

As shown in FIGS. 16 and 17, when the user drags the file icon 1, while the file icon 1 is being displayed at the original drag position, the ghost icon 4 is displayed at the drag position (Step 604). In this case, the controller 11 displays, as the ghost icon 4, an image that has the same shape as the file icon 1 and has, for example, a 50% transparency, on the screen. The ghost icon 4 is displayed at a position obtained by adding (Q-P) to the coordinate position of the file icon 1 at the original drag position.

Further, as shown in FIGS. 16 and 17, when the user drags the file icon 1, the access authority editing icon 6 is displayed on the trajectory of the ghost icon 4 that is drawn by the drag. The access authority editing icons 6 are displayed so as to be arranged in order on the trajectory of the drag with the ghost icon 4 being a top. The access authority editing icon 6 is an icon with which the user edits an access authority of a file to be copied and moved.

In the examples shown here, an edit authority editing icon 6a, a copy authority editing icon 6b, and a print authority editing icon 6c are displayed as the access authority editing icon 6 in the stated order from a side closer to the ghost icon 4.

The edit authority editing icon 6a is an image of a lock, the copy authority editing icon 6b is an image of two overlapping papers, and the print authority editing icon 6c is an image of a printer. What kind of image is to be allocated to which access authority editing icon 6 is not particularly limited and can be changed as appropriate. Typically, any image can be used as long as the user can conjure up the access authority.

At the time shown in FIGS. 16 and 17, the user has not yet operated the access authority editing icon 6, and the access authority editing icon 6 indicates a state of an access authority of a file corresponding to the file icon 1 at the original drag position.

As described above, in this embodiment, according to the drag operation of the file icon 1 by the user, the icon 6 indicating the state of the access authority of the file corresponding to the file icon 1 at the original drag position is displayed. Thus, the user can visually check the state of the access authority set to the file corresponding to the file icon 1 at the original drag position with ease.

Referring back to FIG. 9, upon displaying the ghost icon 4 and the access authority editing icon 6 on the screen, the controller 11 judges whether the coordinates Q on the screen that are currently touched by the user are on a shared folder (Step 606). In Step 606, the controller 11 judges whether the coordinates Q (drag position) are within an area on the screen where a file can be copied or moved. The controller 11 also judges whether the coordinates Q are within an area on the screen where a file is to be opened.

When the coordinates Q currently touched by the user are on a shared folder (YES in Step 606), the controller 11 turns on the droppable flag (Step 607). On the other hand, when the coordinates Q currently touched by the user is not on a shared folder (NO in Step 606), the controller 11 turns off the droppable flag (Step 608), and proceeds to Step 610.

Upon turning on the droppable flag, the controller 11 stores the shared folder indicated by the coordinates Q in the storage 15 (Step 609), and proceeds to the subsequent Step 610. In Step 610, the controller 11 additionally stores the coordinates Q in the history circular buffer.

Figure 10:
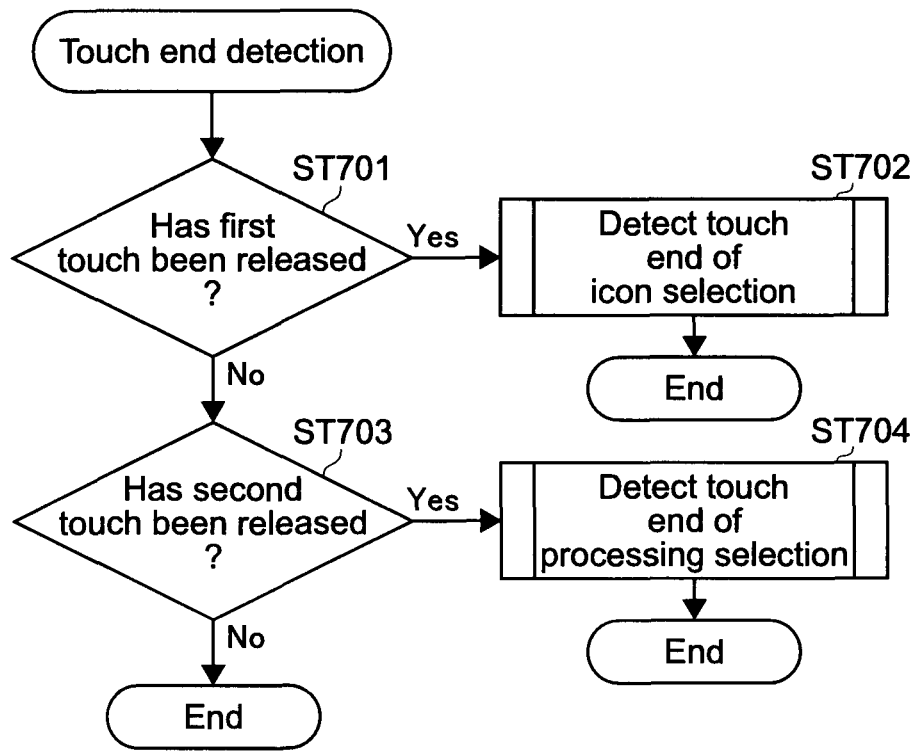
FIG. 10 is a flowchart showing processing of the tablet PC.

Referring to FIG. 10, the processing of Step 108 shown in FIG. 3 (processing carried out when touch end is detected) will be described. When the event acquired from the touch sensor 13 is the touch end detection (YES in Step 107), the controller 11 judges whether the touch end has been detected by a release of the touch by a first finger (Step 701). When judged that the touch end has been detected by a release of the touch by a first finger (YES in Step 107), the controller 11 executes processing that is carried out when a touch end is detected at the time the file icon 1 is selected (Step 702).

On the other hand, when judged that the touch end has not been detected by a release of the touch by a first finger (NO in Step 701), the controller 11 judges whether the touch end has been detected by a release of the touch by a second finger (Step 703). When judged that the touch end has been detected by a release of the touch by a second finger (YES in Step 703), the controller 11 executes processing that is carried out when a touch end is detected at the time processing is selected (Step 704).

Figure 11:
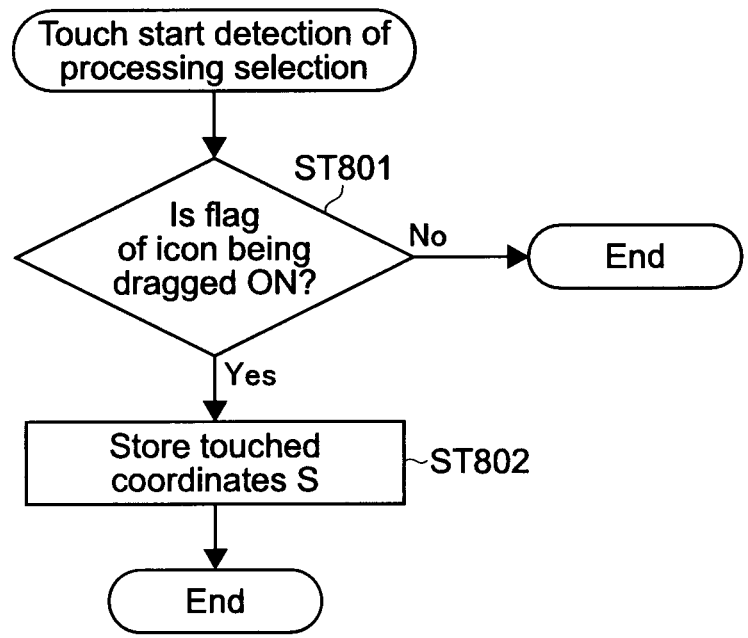
FIG. 11 is a flowchart showing processing of the tablet PC.

Referring to FIG. 11, the processing of Step 304 shown in FIG. 5 (processing carried out when touch start is detected at time processing is selected) will be described. When the touch start is a touch start by a second finger (YES in Step 303), the controller 11 judges whether the flag of the file icon being dragged is ON (Step 801). When the flag of the file icon being dragged is ON (YES in Step 801), the controller 11 stores coordinates S at which the touch start by a second finger has been detected (Step 802).

Figure 12:
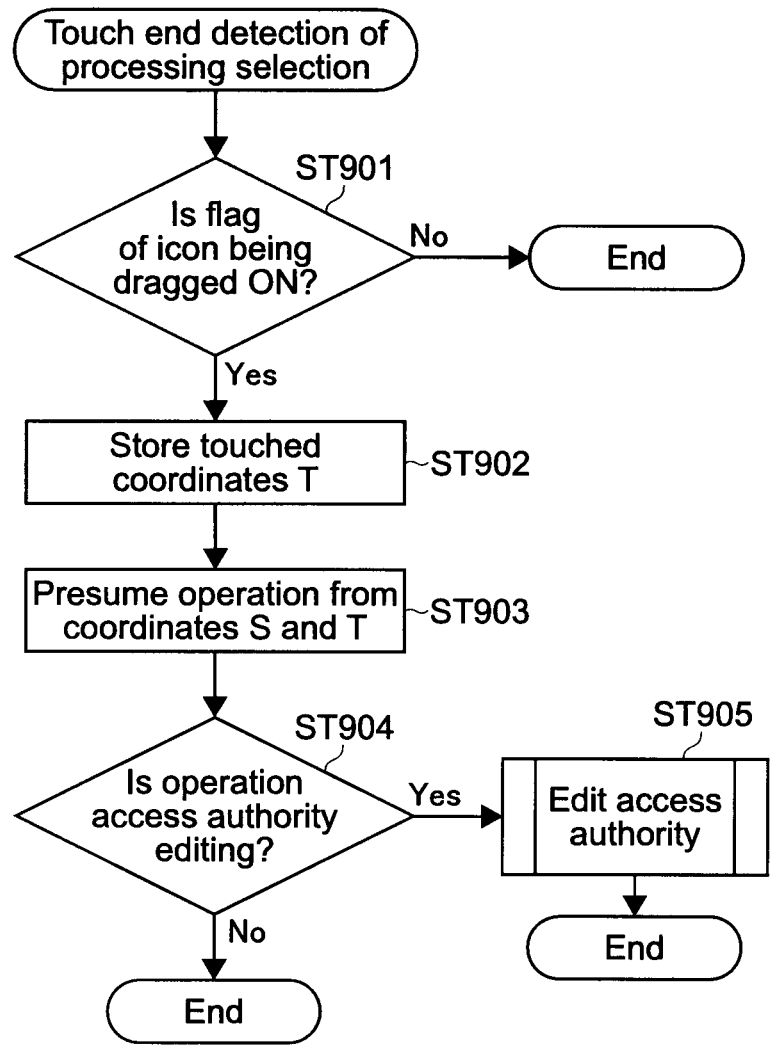
FIG. 12 is a flowchart showing processing of the tablet PC.

Referring to FIG. 12, the processing of Step 704 shown in FIG. 10 (processing carried out when touch end is detected at time processing is selected) will be described. When the touch end is a touch end by a second finger (YES in Step 703), the controller 11 judges whether the flag of the file icon being dragged is ON (Step 901). When the flag of the file icon being dragged is ON (YES in Step 901), the controller 11 stores coordinates T at which the touch end by a second finger has been detected in the storage 15 (Step 902).

Next, the controller 11 presumes what kind of a user operation has been made on the screen based on the coordinates S obtained when the touch start by a second finger has been detected and the coordinates T obtained when the touch end by a second finger has been detected (Step 903).

Then, the controller 11 judges whether the presumed user operation is an operation for editing an access authority (Step 904). When the coordinates S and T match and the coordinates S (coordinates T) match a position at which the access authority editing icon 6 is displayed, the controller 11 presumes that the user operation is the operation for editing an access authority. In other words, the controller 11 presumes that the user operation is the operation for editing an access authority when a tap operation (or touch operation) with respect to the access authority editing icon 6 by a second finger is detected.

When judged that the presumed user operation is the operation for editing an access authority (YES in Step 904), the controller 11 executes processing related to editing of an access authority with respect to a file to be copied or moved (Step 905).

Figure 13:
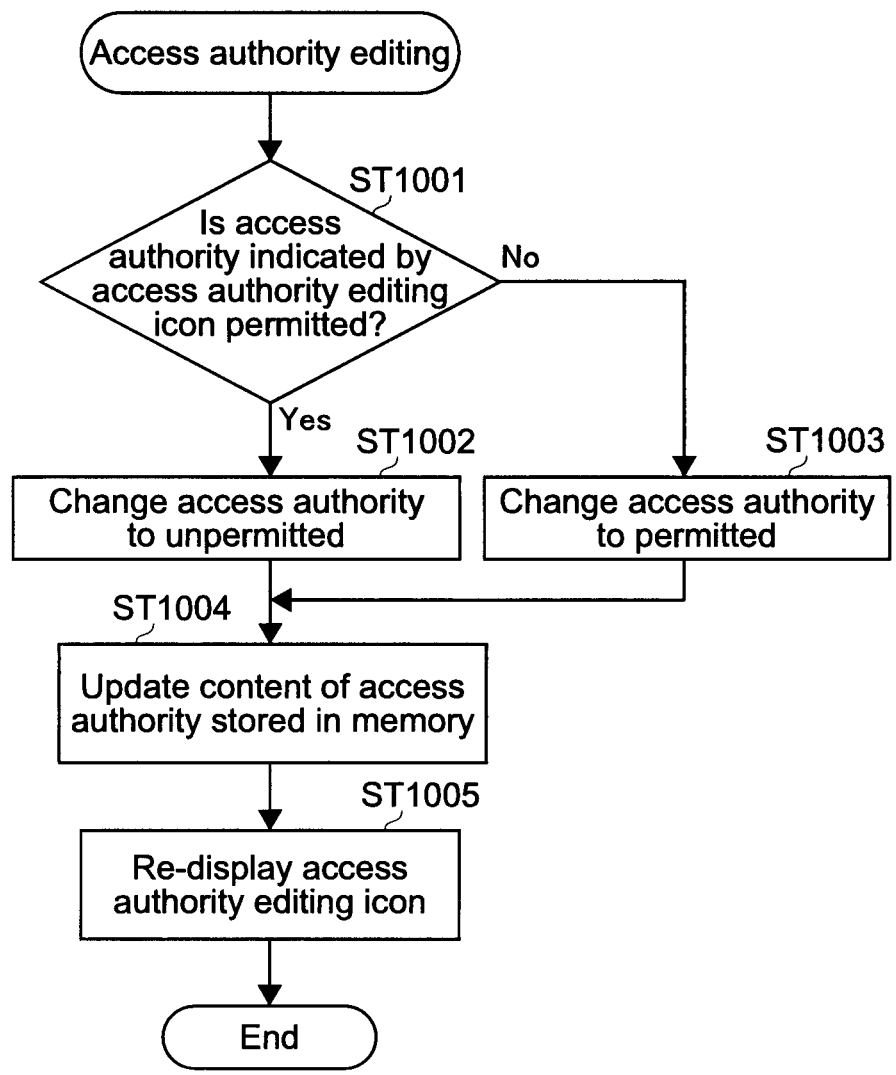
FIG. 13 is a flowchart showing processing of the tablet PC.

Referring to FIG. 13, the processing of Step 905 shown in FIG. 12 (processing related to editing of access authority) will be described. When a tap operation with respect to the access authority editing icon 6 by a second finger is detected (YES in Step 904), the controller 11 judges whether an access authority indicated by the access authority editing icon 6 as a target of the tap operation is permitted (Step 1001).

When the access authority is permitted (YES in Step 1001), the controller 11 changes the access authority with respect to the file to be copied or moved to unpermitted (Step 1002). On the other hand, when the access authority is unpermitted (NO in Step 1001), the controller 11 changes the access authority with respect to the file to be copied or moved to permitted (Step 1003).

Next, the controller 11 updates a content of the access authority (see FIG. 7) stored in the storage 15 according to the change of the access authority (Step 1004). Then, according to the change of the access authority, the access authority editing icon 6 is displayed again (Step 1005).

It should be noted that the access authority with respect to a file to be copied or moved is changed by the processing related to editing of an access authority, and a file of the file icon 1 at the original drag position is not affected at all by the processing related to editing of an access authority.

Figure 18:
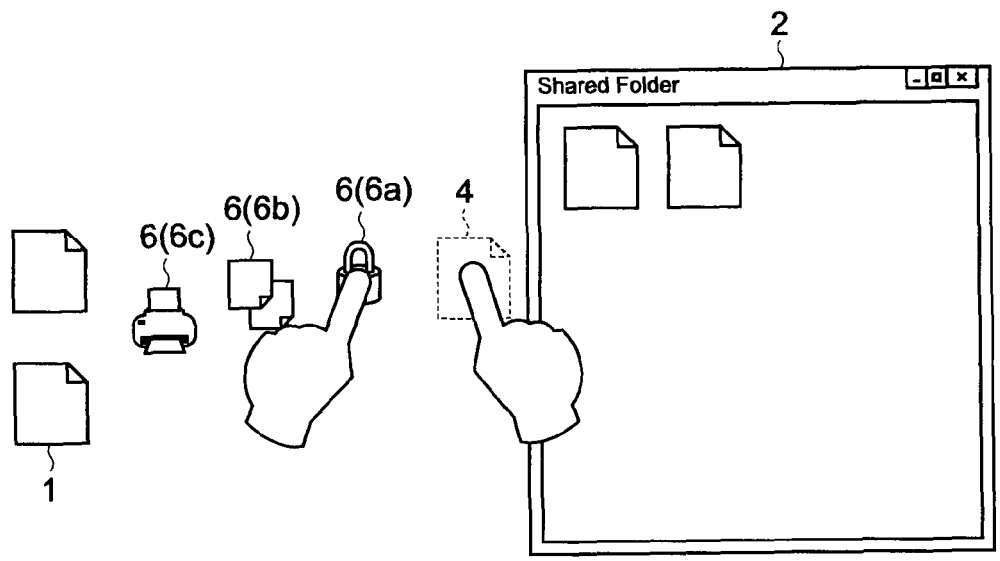
FIG. 18 is a diagram showing a state of the screen at a time the user drags the file icon on the desktop with a finger of one hand, and taps an access authority editing icon with a finger of the other hand without releasing the dragging finger from the screen.
Figure 19:
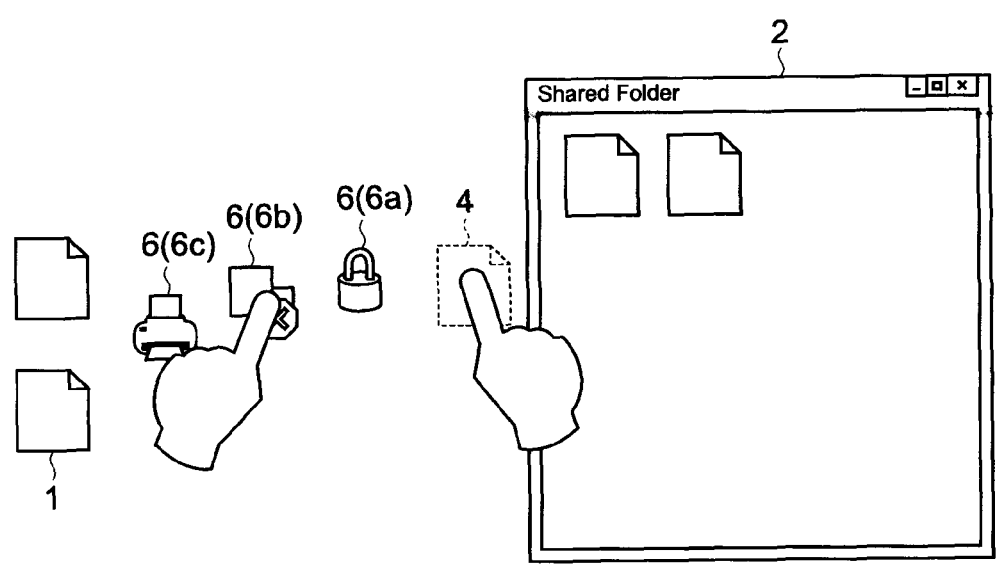
FIG. 19 is a diagram showing a state of the screen at a time the user drags the file icon on the desktop with a finger of one hand, and taps the access authority editing icon with a finger of the other hand without releasing the dragging finger from the screen.
Figure 20:
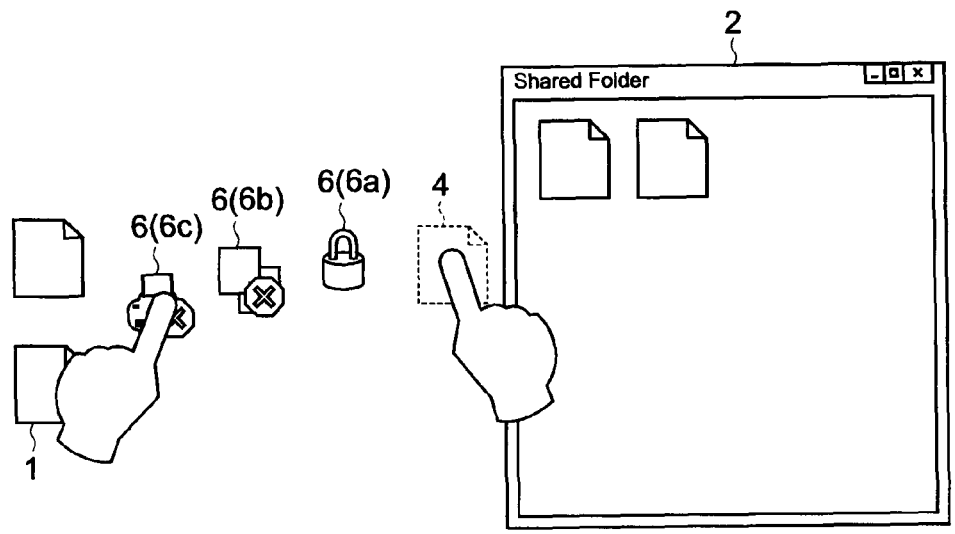
FIG. 20 is a diagram showing a state of the screen at a time the user drags the file icon on the desktop with a finger of one hand, and taps the access authority editing icon with a finger of the other hand without releasing the dragging finger from the screen.

FIGS. 18 to 20 each show a state of the screen at a time the user drags the file icon 1 on the desktop with a finger of one hand, and taps the access authority editing icon 6 with a finger of the other hand without releasing the dragging finger from the screen.

As shown in FIG. 18, when the user taps the edit authority editing icon 6a (image of lock) with a finger of the other hand, according to the tap operation, permitted/unpermitted of an edit authority is inverted (toggle operation) (Steps 1001 to 1005). FIG. 18 shows a state where, by the user tapping a position at which an image of an unlocked lock is displayed, the edit authority is changed from permitted to unpermitted and an image indicating a locked state is displayed on the screen.

As shown in FIG. 19, when the user taps the copy authority editing icon 6b (image of two overlapping papers) with a finger of the other hand, permitted/unpermitted of a copy authority is inverted according to the tap operation. FIG. 19 shows a state where, by the user tapping a position at which the image of two overlapping papers is displayed, the copy authority is changed from permitted to unpermitted and an image in whichx is added to the two papers is displayed.

As shown in FIG. 20, when the user taps the print authority editing icon 6c (image of printer) with a finger of the other hand, permitted/unpermitted of a print authority is inverted according to the tap operation. FIG. 20 shows a state where, by the user tapping a position at which the image of a printer is displayed, the print authority is changed from permitted to unpermitted and an image in whichx is added to the printer is displayed.

As described above, by tapping the access authority editing icon 6, the user can intuitively and easily change the state of the access authority with respect to the file to be copied or moved.

Figure 14:
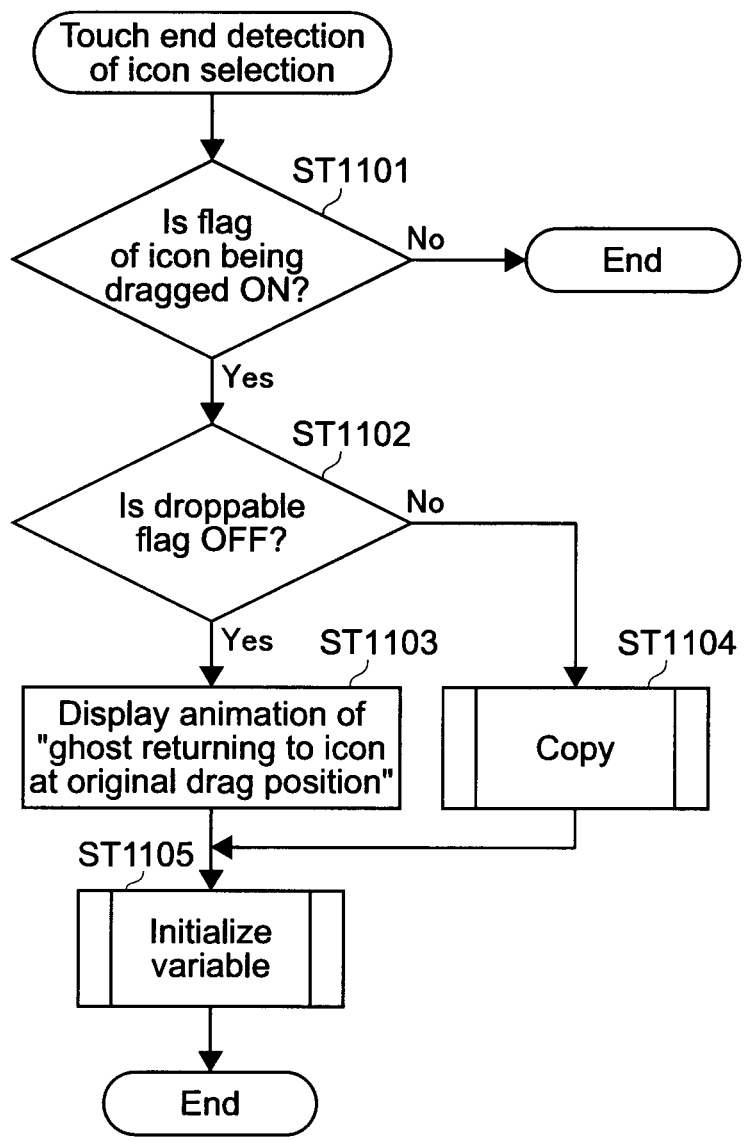
FIG. 14 is a flowchart showing processing of the tablet PC.

Referring to FIG. 14, the processing of Step 702 shown in FIG. 10 (processing carried out when touch end is detected at time file icon 1 is selected) will be described. When judged that the touch end has been detected by a release of the touch by a first finger (YES in Step 701), the controller 11 judges whether the flag of the file icon being dragged is ON (Step 1101). When the flag of the file icon being dragged is ON (YES in Step 1101), the controller 11 judges whether the droppable flag is OFF (Step 1102).

When the droppable flag is OFF (YES in Step 1102), the controller 11 controls display on the screen such that the ghost icon 4 moves and returns to the position of the file icon 1 at the original drag position (Step 1103). In this case, upon moving to the position of the file icon 1, the ghost icon 4 overlaps with the file icon 1 and disappears from the screen. At this time, the controller 11 controls display on the screen such that the access authority editing icon 6 disappears from the screen, corresponding to the return of the ghost icon 4 to the position of the file icon 1 at the original drag position.

By the processing as described above, when the user releases the dragging finger from the screen (drop) while the drag position is not within the area where the file can be moved or copied (and not within area where file is to be opened), the drag is canceled.

By visually checking the state of the screen where the ghost icon 4 moves to the position of the file icon 1, the user can intuitively recognize that the drag operation has been canceled.

On the other hand, when the droppable flag is ON (NO in Step 1102), the controller 11 executes processing related to copy of the file (Step 1104). By the processing as described above, when the user releases the dragging finger from the screen (drop) while the drag position is within the area where the file can be copied or copied (and within area where file is to be opened), the processing related to copy of the file is executed.

After controlling display on the screen such that the ghost icon 4 returns to the position of the file icon 1 at the original drag position (cancels drag) or executing the processing related to copy, the controller 11 proceeds to the subsequent Step 1105. In Step 1105, the controller 11 executes variable initialization processing (see FIG. 4).

Figure 15:
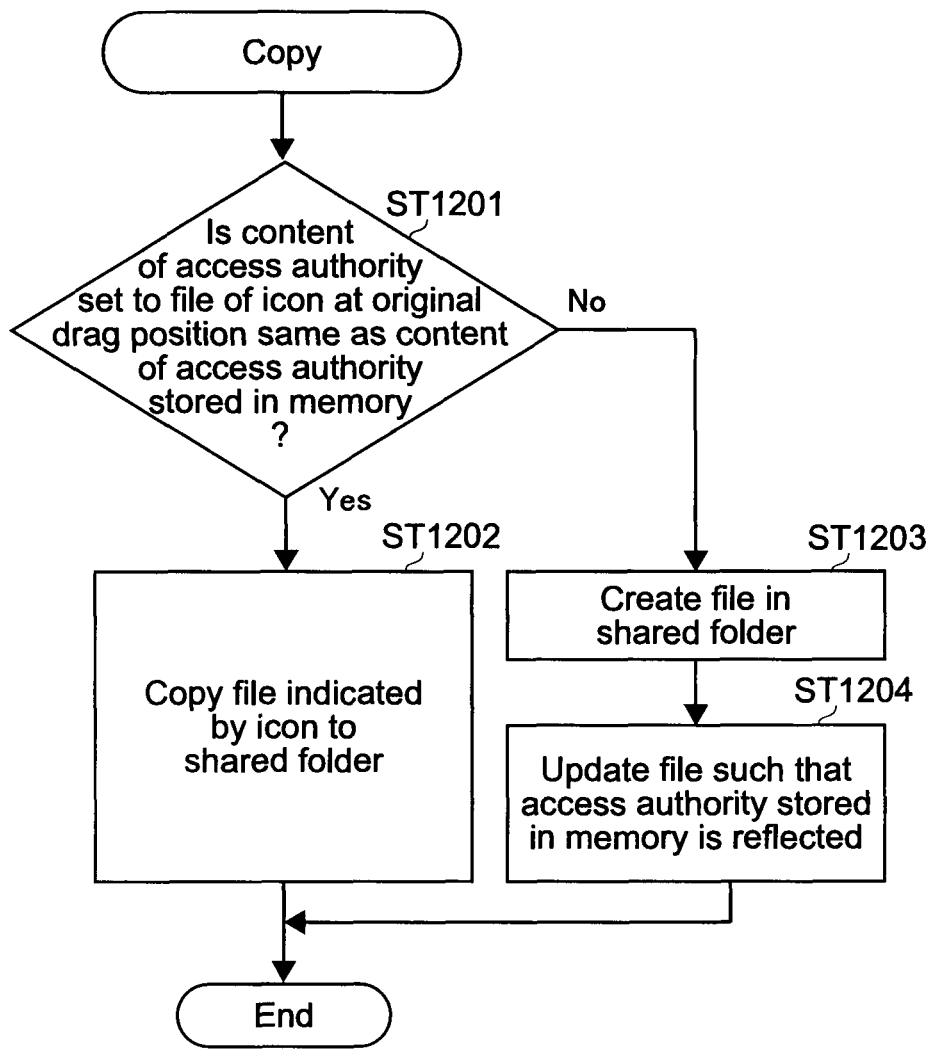
FIG. 15 is a flowchart showing processing of the tablet PC.

Next, referring to FIG. 15, the processing of Step 1104 shown in FIG. 14 (processing related to copy) will be described. When the user positions the dragging finger in the shared folder and releases the finger from the screen (NO in Step 1102), the controller 11 judges whether the content of the access authority set to the file of the file icon 1 at the original drag position and the content of the access authority stored in the storage 15 are the same (Step 1201).

In Step 1201, the controller 11 judges whether the content of the access authority set to the file of the file icon 1 at the original drag position and the content of the access authority updated by the user operation with respect to the access authority editing icon 6 are the same.

When the contents of the two access authorities are the same (YES in Step 1201), the controller 11 creates a copy of the file indicated by the file icon 1 at the original drag position in the shared folder (location on computer indicated by drag position) (Step 1202).

On the other hand, when the contents of the two access authorities differ (NO in Step 1201), the controller 11 creates a new file in the shared folder (location on computer indicated by drag position) (Step 1203). Then, the controller 11 updates the file so that the content of the access authority stored in the storage 15 (see Step 1004) is reflected (Step 1204).

It should be noted that although the file updated in Step 1204 has a different content of the access authority from the file indicated by the file icon 1 at the original drag position, the file content itself is the same as the file indicated by the file icon 1 at the original drag position.

Figure 21:
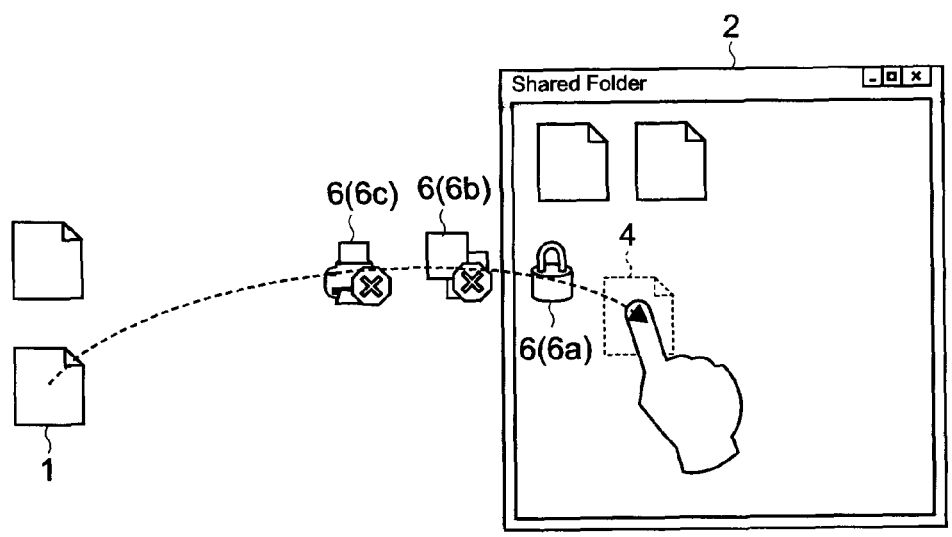
FIG. 21 is a diagram showing a state of the screen at a time the user drags the file icon on the desktop with a finger of one hand, operates the access authority editing icon with a finger of the other hand, and releases the dragging finger in a folder (shared folder) from the screen.
Figure 22:
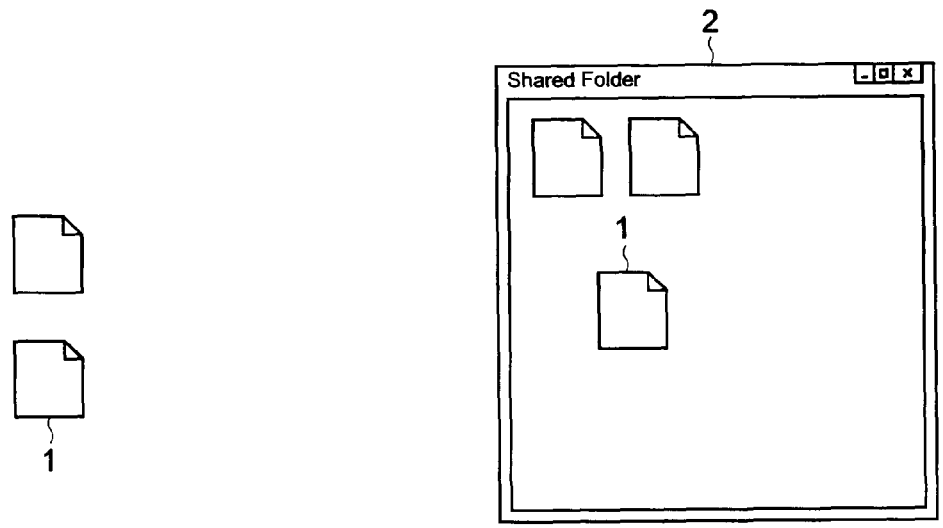
FIG. 22 is a diagram showing a state of the screen at a time the user drags the file icon on the desktop with a finger of one hand, operates the access authority editing icon with a finger of the other hand, and releases the dragging finger in a folder (shared folder) from the screen.

FIGS. 21 to 22 each show a state of the screen at a time the user drags the file icon 1 on the desktop with a finger of one hand, operates the access authority editing icon 6 with a finger of the other hand, and releases the dragging finger in the folder 2 (shared folder) from the screen.

When in the state shown in FIG. 21, the user releases the finger dragging the file icon 1 from the screen, as shown in FIG. 22, the image indicating the file icon 1 is displayed at the drop position. At this time, the access authority editing icon 6 also disappears from the screen. At this time, inside the tablet PC 100, a new file is created in the folder 2 (shared folder) (Step 1203). Then, the file is updated such that the content of the access authority stored in the storage 15 is reflected (change of state of access authority is reflected) (Step 1204).

In the example shown in FIG. 21, the access authorities of the edit authority editing icon 6a (image of lock), the copy authority editing icon 6b (image of two overlapping papers), and the print authority editing icon 6c (image of printer) are all "unpermitted". Therefore, in this case, a file having the same content as the file of the file icon 1 at the original drag position, for which the edit authority, copy authority, and print authority are set to unpermitted, is created in the folder 2 (shared folder).

As described above, by releasing the dragging finger from the screen after tapping the access authority editing icon 6, the user can copy a file onto which the state of the access authority is reflected to an arbitrary folder 2.

The descriptions of Step 1104 have been given on the case where the file related to the file icon 1 as the drag target is copied. However, it is also possible to execute file moving processing in place of the file copy.

Various Modified Examples

The descriptions above have been given on the case where the access authority editing icon 6 is displayed at the drag start of the file icon 1 as the timing for displaying the access authority editing icon 6. However, the timing for displaying the access authority editing icon 6 is not limited thereto.

For example, when the user drags the file icon with a finger of one hand, and positions the finger on the display area of the folder 2 (area on screen where file can be copied or moved (and area where file to be opened)), the access authority editing icon 6 may be displayed. In this case, when the user releases the finger dragging the file icon 1 from the display area of the folder 2, the access authority editing icon 6 disappears from the screen.

Referring to FIG. 9, in this case, the controller 11 only needs to, before Step 605, judge whether the coordinates Q (drag position) are on the shared folder, and display, when the judgment is positive, the access authority editing icon 6 on the screen. Thus, the access authority editing icon 6 can be displayed on the screen at an appropriate timing.

Alternatively, at still another display timing, the access authority editing icon 6 may be displayed on the screen.

Figure 23:
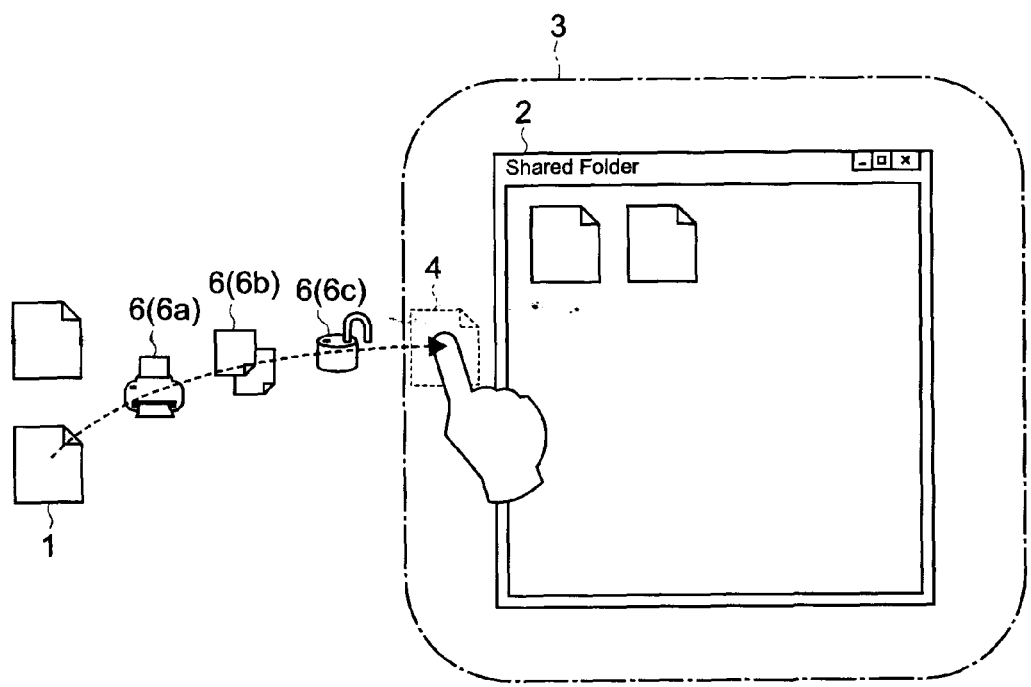
FIG. 23 is a diagram for describing still another example of a timing for displaying the access authority editing icon.

FIG. 23 shows still another example of the timing for displaying the access authority editing icon 6. In the example shown in FIG. 23, a case where the access authority editing icon 6 is displayed on the screen at a time the user positions a finger dragging the file icon 1 displayed on the desktop in an area 3 is shown. In this case, when the user releases the finger dragging the file icon 1 from the area 3, the access authority editing icon 6 disappears from the screen. The area 3 is set to be larger than the display area of the folder 2 on the screen.

Referring to FIG. 9, in this case, the controller 11 only needs to, before Step 605, judge whether the coordinates Q (drag position) are in the area 3, and display, when the judgment is positive, the access authority editing icon 6 on the screen.

In this case, the user positions a finger of the one hand dragging the file icon 1 at a position inside the area 3 and outside the display area of the folder 2.

Then, in this state, the user taps the access authority editing icon 6 with a finger of the other hand to select permitted/unpermitted of the access authority, so that preparation is made to open the file.

After that, the user only needs to position the finger of the one hand dragging the file icon 1 in the inside of the display area of the folder 2, and releases the finger from the screen. In this manner, the file onto which the change of the access authority state is reflected is copied into the folder 2.

Here, the reason why while positioning the finger of the one hand at the position inside the area 3 and outside the display area of the folder 2, the user taps the access authority editing icon 6 with the finger of the other hand will be described.

As a comparison, a case where while positioning the finger of the one hand dragging the file icon 1 in the inside of the display area of the folder 2, the user taps the access authority editing icon 6 with the finger of the other hand is considered. In this case, it is assumed that when the user taps the access authority editing icon 6 with the finger of the other hand, the finger of the one hand dragging the file icon 1 is erroneously released from the screen. In this case, the file onto which the access authority intended by the user is not reflected is opened. For preventing this, while positioning the finger of the one hand at the position inside the area 3 and outside the display area of the folder 2, the user taps the access authority editing icon 6 with the finger of the other hand.

In other words, by setting the area 3 to be larger than the display area of the folder 2 (shared folder) on the screen, an erroneous operation by the user can be prevented.

It should be noted that from the same reason, in FIGS. 18 to 20, while positioning the finger of the one hand dragging the file icon 1 in the outside of the display area of the folder 2, the user taps the access authority editing icon 6 with the finger of the other hand.

The descriptions above have been given on the case where the access authority editing icon 6 is displayed on the trajectory of the ghost icon 4 that is drawn by the drag. However, the position at which the access authority editing icon 6 is displayed is not limited thereto. For example, the access authority editing icon 6 may be displayed near the ghost icon 4 surrounding the ghost icon 4. Alternatively, the access authority editing icon 6 may be displayed at an upper, lower, right, or left end position of the screen.

At which position the access authority editing icon 6 is displayed can be changed as appropriate.

The descriptions above have been given on the case where the tap operation (or touch operation) of the access authority editing icon 6 changes permitted/unpermitted of the access authority. However, a flick operation or a drag operation with respect to the access authority editing icon 6 may change permitted/unpermitted of the access authority. For example, when the user flicks the access authority editing icon 6 displayed near the ghost icon 4 in a direction that draws apart from the ghost icon 4, permitted/unpermitted of the access authority may be changed. Alternatively, for example, when the access authority editing icon 6 displayed at a position apart from the ghost icon 4 is dragged and dropped near the ghost icon 4, permitted/unpermitted of the access authority may be changed.

The descriptions above have been given on the case where a single file icon 1 is a drag target. However, it is also possible to collectively drag a plurality of file icons 1. In this case, by the user making a user operation with respect to the access authority editing icon 6, permitted/unpermitted of the access authorities of the plurality of file icons 1 is collectively changed.

The descriptions above have been given on the case where as the icon indicating the state of the access authority, the access authority editing icon 6 is displayed on the screen. That is, the descriptions above have been given on the assumption that the icon with which the state of the access authority can be operated is displayed on the screen according to the drag operation. However, the icon indicating the state of the access authority does not necessarily need to be operable by the user. In this case, the icon indicating the state of the access authority of the file icon 1 as the drag target is simply displayed on the screen according to the drag operation.

As described above, also in the case where the icon is not operable by the user, the user can visually check the state of the access authority set to the file corresponding to the file icon 1 at the original drag position with ease. It should be noted that when the icon is not operable, it is possible to adopt a single-touch system. Alternatively, in this case, in place of the input system using the touch sensor 13, according to the drag operation by a mouse (input unit), the icon indicating the state of the access authority may be displayed on the screen.

In the embodiments above, the tablet PC 100 has been taken as an example of the electronic apparatus 100. However, the electronic apparatus 100 is not limited to the tablet PC 100. Other examples of the electronic apparatus 100 include a desktop PC, a laptop PC, a cellular phone, a portable music player, and a digital camera.

The present disclosure may also take the following structures.

(1) An electronic apparatus, including:

an input unit configured to detect a user operation and output a signal corresponding to the user operation; and a controller configured to cause a data icon to be displayed on a screen of a display unit, judge a drag operation with respect to the data icon based on the signal from the input unit, and cause an icon to be displayed on the screen according to the drag operation, the icon indicating a state of an access authority of data related to the data icon.

(2) The electronic apparatus according to (1),
in which the controller causes, while causing the data icon to be displayed at an original drag position, a copy of the data icon to be displayed at a drag position according to the drag operation with respect to the data icon, and causes the icon to be displayed on a trajectory of the copy of the data icon that is drawn by movement of the copy of the data icon according to the drag operation.

(3) The electronic apparatus according to (1) or (2),
in which the controller causes, while causing the data icon to be displayed at an original drag position, a copy of the data icon to be displayed at a drag position according to the drag operation with respect to the data icon, judges whether the drag position is within a predetermined area on the screen, and causes, when the drag position is within the area, the icon to be displayed.

(4) The electronic apparatus according to (3),
in which the predetermined area on the screen is an area where the data can be one of copied and moved, and which at least includes an area where the data is to be opened.

(5) The electronic apparatus according to (4),
in which the predetermined area on the screen is an area where the data can be one of copied and moved, and which is set to be larger than an area where the data is to be opened.

(6) The electronic apparatus according to any one of (1) to (5),
in which the controller causes an access authority editing icon for editing a state of an access authority with respect to data to be one of copied and moved to be displayed as the icon on the screen, judges a user operation with respect to the access authority editing icon based on the signal from the input unit, and changes the state of the access authority with respect to the data to be one of copied and moved according to the user operation.

(7) A program that causes an electronic apparatus to execute the steps of:
detecting a user operation;
outputting a signal corresponding to the user operation;
displaying a data icon on a screen of a display unit;
judging a drag operation with respect to the data icon based on the signal; and
displaying an icon on the screen according to the drag operation, the icon indicating a state of an access authority of data related to the data icon.

(8) A control method, including:
detecting a user operation;
outputting a signal corresponding to the user operation;
displaying a data icon on a screen of a display unit;
judging a drag operation with respect to the data icon based on the signal; and
displaying an icon on the screen according to the drag operation, the icon indicating a state of an access authority of data related to the data icon.

The present disclosure contains subject matter related to that disclosed in Japanese Priority Patent Application JP 2011-114177 filed in the Japan Patent Office on May 20, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
an input unit configured to detect a user operation and output a signal corresponding to the user operation; and
a controller configured to cause a data icon to be displayed on a screen of a display unit, judge a drag operation with respect to the data icon based on the signal from the input unit, and cause an icon to be displayed on the screen according to the drag operation, the icon indicating a state of an access authority of data related to the data icon and configured to toggle between indicating an authority granted indicating state and an authority denied indicating state with respect to the access authority of the data related to the data icon,
wherein the state of the access authority of the data related to the data icon is configured to be toggled upon an operation performed on the icon during the drag operation and prior to release of the drag operation.

2. The electronic apparatus according to claim 1,
wherein the controller causes, while causing the data icon to be displayed at an original drag position, a copy of the data icon to be displayed at a drag position according to the drag operation with respect to the data icon, and causes the icon to be displayed on a trajectory of the copy of the data icon that is drawn by movement of the copy of the data icon according to the drag operation.

3. The electronic apparatus according to claim 1,
wherein the controller causes, while causing the data icon to be displayed at an original drag position, a copy of the data icon to be displayed at a drag position according to the drag operation with respect to the data icon, judges whether the drag position is within a predetermined area on the screen, and causes, when the drag position is within the area, the icon to be displayed.

4. The electronic apparatus according to claim 3,
wherein the predetermined area on the screen is an area where the data can be one of copied and moved, and which at least includes an area where the data is to be opened.

5. The electronic apparatus according to claim 4,
wherein the predetermined area on the screen is an area where the data can be one of copied and moved, and which is set to be larger than an area where the data is to be opened.

6. The electronic apparatus according to claim 1,
wherein the controller causes an access authority editing icon for editing a state of an access authority with respect to data to be one of copied and moved to be displayed as the icon on the screen, judges a user operation with respect to the access authority editing icon based on the signal from the input unit, and changes the state of the access authority with respect to the data to be one of copied and moved according to the user operation.

7. The electronic apparatus according to claim 1,
wherein the state of the access authority is whether or not the data related to the data icon is authorized to be edited.

8. The electronic apparatus according to claim 1,
wherein the state of the access authority is whether or not the data related to the data icon is authorized to be copied.

9. The electronic apparatus according to claim 1,
wherein the state of the access authority is whether or not the data related to the data icon is authorized to be printed.

10. The electronic apparatus according to claim 1,
wherein the controller further configured to cause a plurality of icons to be displayed on the screen according to the drag operation, the plurality of icons each indicating a state of a different respective access authority of data related to the data icon and configured to toggle between indicating an authority granted indicating state and an authority denied indicating state with respect to the respective access authority.

11. The electronic apparatus according to claim 10,
wherein the plurality of icons indicate the state of the access authority as being whether or not the data related to the data icon is authorized to be edited, authorized to be copied and authorized to be printed.

12. The electronic apparatus according to claim 1,
where the state indicated by the icon is changed by tapping the icon at a displayed location on the screen.

13. The electronic apparatus according to claim 1,
wherein the icon is displayed at a location along a path of the drag operation.

14. The electronic apparatus according to claim 13,
wherein the icon is displayed apart from the display of the data icon.

15. The electronic apparatus according to claim 1,
wherein the icon is displayed apart from the display of the data icon.

16. The electronic apparatus according to claim 1,
wherein the indication of the state of the access authority of the data related to the data icon is an indication of whether or not a user is authorized to have access to the data after completion of an operation initiated by the drag operation.

17. A non-transitory computer-readable medium having embodied thereon a program, which when executed by an electronic apparatus causes the electronic apparatus to perform a method, the method comprising:

detecting a user operation;
outputting a signal corresponding to the user operation;
displaying a data icon on a screen of a display unit;
judging a drag operation with respect to the data icon based on the signal; and
displaying an icon on the screen according to the drag operation, the icon indicating a state of an access authority of data related to the data icon and configured to toggle between indicating an authority granted indicating state and an authority denied indicating state with respect to the access authority of the data related to the data icon,
wherein the state of the access authority of the data related to the data icon is configured to be toggled upon an operation performed on the icon during the drag operation and prior to release of the drag operation.

18. A control method, comprising:
detecting a user operation;
outputting a signal corresponding to the user operation;
displaying a data icon on a screen of a display unit;
judging a drag operation with respect to the data icon based on the signal; and
displaying an icon on the screen according to the drag operation, the icon indicating a state of an access authority of data related to the data icon and configured to toggle between indicating an authority granted indicating state and an authority denied indicating state with respect to the access authority of the data related to the data icon,
wherein the state of the access authority of the data related to the data icon is configured to be toggled upon an operation performed on the icon during the drag operation and prior to release of the drag operation.

* * * * *